(12) United States Patent
Stich et al.

(10) Patent No.: US 9,817,699 B2
(45) Date of Patent: Nov. 14, 2017

(54) ADAPTIVE AUTOSCALING FOR VIRTUALIZED APPLICATIONS

(71) Applicant: ELASTICBOX INC., Mountain View, CA (US)

(72) Inventors: Slater Stich, Sunnyvale, CA (US); Alberto Arias Maestro, Mountain View, CA (US); Ravi Srivatsav, San Jose, CA (US)

(73) Assignee: ElasticBox Inc., Mountain View, CA (US)

( * ) Notice: Subject to any disclaimer, the term of this patent is extended or adjusted under 35 U.S.C. 154(b) by 60 days.

(21) Appl. No.: 14/206,333

(22) Filed: Mar. 12, 2014

(65) Prior Publication Data

US 2014/0282591 A1 Sep. 18, 2014

Related U.S. Application Data

(60) Provisional application No. 61/780,384, filed on Mar. 13, 2013.

(51) Int. Cl.
*G06F 9/455* (2006.01)
*G06F 9/46* (2006.01)
(Continued)

(52) U.S. Cl.
CPC ............. *G06F 9/50* (2013.01); *G06F 9/5005* (2013.01); *G06F 9/505* (2013.01); *G06F 9/5011* (2013.01);
(Continued)

(58) Field of Classification Search
None
See application file for complete search history.

(56) References Cited

U.S. PATENT DOCUMENTS 6,459,682 B1 10/2002 Ellesson et al.
6,560,717 B1 * 5/2003 Scott ................. G06F 9/505
714/4.1
(Continued)

FOREIGN PATENT DOCUMENTS

CN 101986274 A 3/2011
CN 102567119 A 7/2012
(Continued)

OTHER PUBLICATIONS

Gong et al., "Press: PRedictive Elastic ReSource Scaling for Cloud Systems", International Conference on Network and Service Management (CNSM), Oct. 25-29, 2010, pp. 9-16.
(Continued)

*Primary Examiner* — Charles Swift
(74) *Attorney, Agent, or Firm* — Swanson & Bratschun, L.L.C.

(57) ABSTRACT

Virtualized applications are autoscaled by receiving performance data in time-series format from a running virtualized application, computationally analyzing the performance data to determine a pattern therein, and extending the performance data to a time in the future based at least on the determined pattern. The extended performance data is analyzed to determine if resources allocated to the virtualized application are under-utilized or over-utilized, and a schedule for re-allocating resources to the virtualized application based at least in part on a result of the analysis of the extended performance data is created.

18 Claims, 2 Drawing Sheets

(51) Int. Cl.
*G06F 15/173* (2006.01)
*G06F 9/50* (2006.01)

(52) U.S. Cl.
CPC .......... *G06F 9/5016* (2013.01); *G06F 9/5027* (2013.01); *G06F 9/5061* (2013.01); *G06F 9/5077* (2013.01); *G06F 9/5083* (2013.01); *G06F 2209/508* (2013.01)

(56) References Cited

U.S. PATENT DOCUMENTS

| | | | |
|---|---|---|---|
| 8,145,455 B2 | 3/2012 | Cherkasova et al. | |
| 8,260,603 B2 | 9/2012 | Cherkasova et al. | |
| 8,341,624 B1 | 12/2012 | Hobbs | |
| 8,495,627 B2 | 7/2013 | Barsness et al. | |
| 8,499,066 B1* | 7/2013 | Zhang | H04L 47/823 709/200 |
| 8,572,623 B2 | 10/2013 | Bhogal et al. | |
| 8,621,080 B2 | 12/2013 | Iyoob et al. | |
| 8,621,477 B2* | 12/2013 | Ferdous | G06F 11/3442 718/104 |
| 8,738,972 B1* | 5/2014 | Bakman | G06F 11/0712 714/47.1 |
| 2002/0131386 A1* | 9/2002 | Gwon | H04W 36/0011 370/338 |
| 2005/0289540 A1* | 12/2005 | Nguyen | G06F 9/45558 718/1 |
| 2009/0183218 A1 | 7/2009 | Li et al. | |
| 2010/0076925 A1* | 3/2010 | Honigfort | G06F 17/30306 707/609 |
| 2010/0191854 A1* | 7/2010 | Isci | G06F 1/3203 709/226 |
| 2010/0199285 A1* | 8/2010 | Medovich | G06F 9/45533 718/104 |
| 2010/0242045 A1* | 9/2010 | Swamy | G06F 9/455 718/104 |
| 2011/0004574 A1 | 1/2011 | Jeong et al. | |
| 2011/0099267 A1* | 4/2011 | Suri | G06F 9/4856 709/224 |
| 2012/0233315 A1 | 9/2012 | Hoffman et al. | |
| 2012/0310376 A1 | 12/2012 | Krumm et al. | |
| 2013/0007259 A1* | 1/2013 | Pacheco-Sanchez | G06F 11/3447 709/224 |
| 2013/0080142 A1 | 3/2013 | Gangemi et al. | |
| 2013/0138816 A1 | 5/2013 | Kuo et al. | |
| 2013/0166486 A1 | 6/2013 | Kim | |
| 2013/0174149 A1* | 7/2013 | Dasgupta | G06F 9/5077 718/1 |
| 2013/0218547 A1 | 8/2013 | Ostermeyer et al. | |
| 2013/0275974 A1* | 10/2013 | Cao | G06F 9/5077 718/1 |
| 2013/0346969 A1* | 12/2013 | Shanmuganathan | G06F 9/4856 718/1 |
| 2014/0089495 A1* | 3/2014 | Akolkar | H04L 41/147 709/224 |
| 2014/0229614 A1* | 8/2014 | Aggarwal | H04M 3/2227 709/224 |
| 2015/0095432 A1* | 4/2015 | Soundararajan | H04L 51/32 709/206 |
| 2015/0178120 A1* | 6/2015 | Prasek | G06F 9/45558 718/1 |

FOREIGN PATENT DOCUMENTS

| | | |
|---|---|---|
| CN | 103164279 A | 6/2013 |
| EP | 1909182 A1 | 4/2008 |
| EP | 2187567 A1 | 5/2010 |
| GB | 2475897 A | 6/2011 |
| KR | 10-1262679 B1 | 5/2013 |
| WO | 2008/119929 A2 | 10/2008 |
| WO | 2009/061432 A1 | 5/2009 |
| WO | 2009/108344 A1 | 9/2009 |
| WO | 2010/058989 A1 | 5/2010 |
| WO | 2011/031459 A2 | 3/2011 |
| WO | 2012/066604 A1 | 5/2012 |
| WO | 2013/009665 A1 | 1/2013 |
| WO | 2013/082119 A1 | 6/2013 |
| WO | 2013/169903 A1 | 11/2013 |
| WO | 2013/192059 A2 | 12/2013 |

OTHER PUBLICATIONS

Kundu et al., "Application Performance Modeling in a Virtualized Environment", IEEE 16th International Symposium on High Performance Computer Architecture (HPCA), Bangalore, India, Jan. 9-14, 2010, 10 pages.

Mozafari et al., "Resource and Performance Prediction for Building a Next Generation Database Cloud", 6th Biennial Conference on Innovative Data Systems Research (CIDR Ö13), Asilomar, California, USA, Jan. 6-9, 2013, 4 pages.

Wood et al., "Predicting Application Resource Requirements in Virtual Environments", Proceedings of the ACM/IFIP/USENIX 9th International Middleware Conference (Middleware'2008), Leuven, Belgium, Dec. 1-5, 2008, 24 pages.

Wood et al., "Profiling and Modeling Resource Usage of Virtualized Applications", Middleware 2008, Lecture Notes in Computer Science, vol. 5346, 2008, pp. 366-387.

* cited by examiner

ADAPTIVE AUTOSCALING FOR VIRTUALIZED APPLICATIONS

CROSS-REFERENCE TO RELATED APPLICATIONS

This application claims priority to and the benefit of U.S. Provisional Patent Application Ser. No. 61/780,384, filed on Mar. 13, 2013, which is hereby incorporated herein by reference in its entirety.

TECHNICAL FIELD

Embodiments of the present invention relate generally to virtualized applications and, more particularly, allocating and re-allocating resources to virtualized applications.

BACKGROUND

The emergence of cloud-computing resource providers and management tools for private virtualization clusters has allowed virtualized applications to be deployed on resources that may be changed or re-provisioned on an as-needed basis. For example, a developer who knows that his or her deployed application will receive only modest workloads may choose to run the application on an instance having allocated only a modest amount of resources. As time goes on, however, the developer may discover that the application is now receiving larger workloads and may consequently decide to upgrade larger instance and/or create a cluster of a plurality of small instances behind a load balancer. Should demand fall in the future, the developer may downgrade back to the single, small instance. The ability to provision and re-provision compute resources is thus a fundamental benefit of cloud computing and of virtualization in general; it allows one to 'right-scale' an application so that the resources upon which it is deployed match the computational demands it experiences and thus avoid paying for un-needed resources.

The task of right-scaling a virtualized application is, however, difficult in practice. For example, scaling an application based on instantaneous demand (sometimes called autoscaling) is often an inappropriate resource-allocation scheme; amongst other things, such scaling does not allow the advance provision of resources, and it is necessarily blind to long-term usage patterns. Consequently, it is desirable to have a resource-provisioning plan having a longer horizon. The task of forecasting an application's usage patterns, however, even when restricted to simply extending performance-metric time series (e.g., percent CPU utilization over time, disk IO over time, etc.), may be a labor-intensive process. Furthermore, even if performance metrics could be predicted in advance, one still faces the problem of translating this knowledge into intelligent decisions to upgrade or downgrade a deployment. For example, suppose someone has an application running on three small instances, and that he or she knows with certainty that over the next month, these instances will respectively run constantly at 20%, 60%, and 80% CPU utilization. If, say, the application is instead deployed on two medium instances, these CPU utilization numbers would change unpredictably. In other words, it may be difficult to determine how performance metrics on one deployment will translate into performance metrics on another deployment of the same application on a different resource set.

This problem may be exacerbated by the fact that performance patterns are often application-specific. For example, suppose there are two applications, A and B, and two resource deployment patterns (e.g. three small instances or two medium instances), X and Y. Suppose that on the resource pattern X, application A's memory utilization fluctuates between 70% and 80% and that on resource pattern Y, it fluctuates between 40% and 50%. Suppose further that application B's memory utilization on resource pattern X also fluctuates between 70% and 80%. Given this information, it cannot be determined with certainty that application B's utilization on Y will also be between 40% and 50%, even though application A behaved that way, because of potential differences between the needs of applications A and B. The way that an application performs on a resource is often very specific to that application, making it extremely difficult to predict how other applications will perform when deployed on different resource types. A need therefore exists for a more efficient way to scale resource allocations for applications.

SUMMARY

In general, various aspects of the systems and methods described herein monitor performance data and/or resource utilization of one or more virtualized applications and provide the performance data in a time-series format. The collected data is analyzed to extend the time series into the future (i.e., to predict the future performance of the virtualized application). If an under- or over-allocation of resources is detected, advice is given to the virtualized application and/or a system upon which it is running to re-allocate the resources. The detection of the under- or over-allocation of resources may be based on the performance data, previously collected performance data, or by noting the effects of a previous re-allocation of resources on the virtualized application (or a similar application).

In one aspect, a method for autoscaling virtualized applications includes electronically receiving performance data in time-series format from a running virtualized application; computationally analyzing the performance data to determine a pattern therein; storing the extended performance data in a computer database; extending the performance data to a time in the future based at least on the determined pattern; computationally analyzing the extended performance data to determine if resources allocated to the virtualized application are under-utilized or over-utilized; and creating a schedule for re-allocating resources to the virtualized application based at least in part on a result of the analysis of the extended performance data.

Previously collected performance data for the virtualized application or a similar virtualized application may be analyzed, wherein determining if resources allocated to the virtualized application are under-utilized or over-utilized is further based on the previously collected performance data. The previously collected performance data may include a point in time at which a resource re-allocation occurred, and wherein determining if resources allocated to the virtualized application are under-utilized or over-utilized is further based an effect of the re-allocation. The similar virtualized application may share a name, type, class or behavior pattern with the virtualized application. The pattern may include a fitted curve, line, or periodic function. The time in the future may include one hour, twelve hours, one day, or one month. Information regarding events external to the virtualized application may be received, wherein determining if resources allocated to the virtualized application are under-utilized or over-utilized is further based the external events.

The external events may include a time of day, week, month, or year, a software launch, or a marketing event.

In another aspect, a system for autoscaling virtualized applications includes a computer processor configured for executing computer instructions for computationally executing the steps of: receiving performance data in time-series format from a running virtualized application; analyzing the performance data to determine a pattern therein; extending the performance data to a time in the future based at least on the determined pattern; analyzing the extended performance data to determine if resources allocated to the virtualized application are under-utilized or over-utilized; and creating a schedule for re-allocating resources to the virtualized application based at least in part on a result of the analysis of the extended performance data; and a database for storing performance data related to the execution of the plurality of virtual machines.

Previously collected performance data for the virtualized application or a similar virtualized application may be analyzed, wherein determining if resources allocated to the virtualized application are under-utilized or over-utilized is further based on the previously collected performance data. The previously collected performance data may include a point in time at which a resource re-allocation occurred, and wherein determining if resources allocated to the virtualized application are under-utilized or over-utilized is further based an effect of the re-allocation. The similar virtualized application may share a name, type, class or behavior pattern with the virtualized application. The pattern may include a fitted curve, line, or periodic function. The time in the future may include one hour, twelve hours, one day, or one month. Information regarding events external to the virtualized application may be received, wherein determining if resources allocated to the virtualized application are under-utilized or over-utilized is further based the external events. The external events may include a time of day, week, month, or year, a software launch, or a marketing event.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Figure 1:
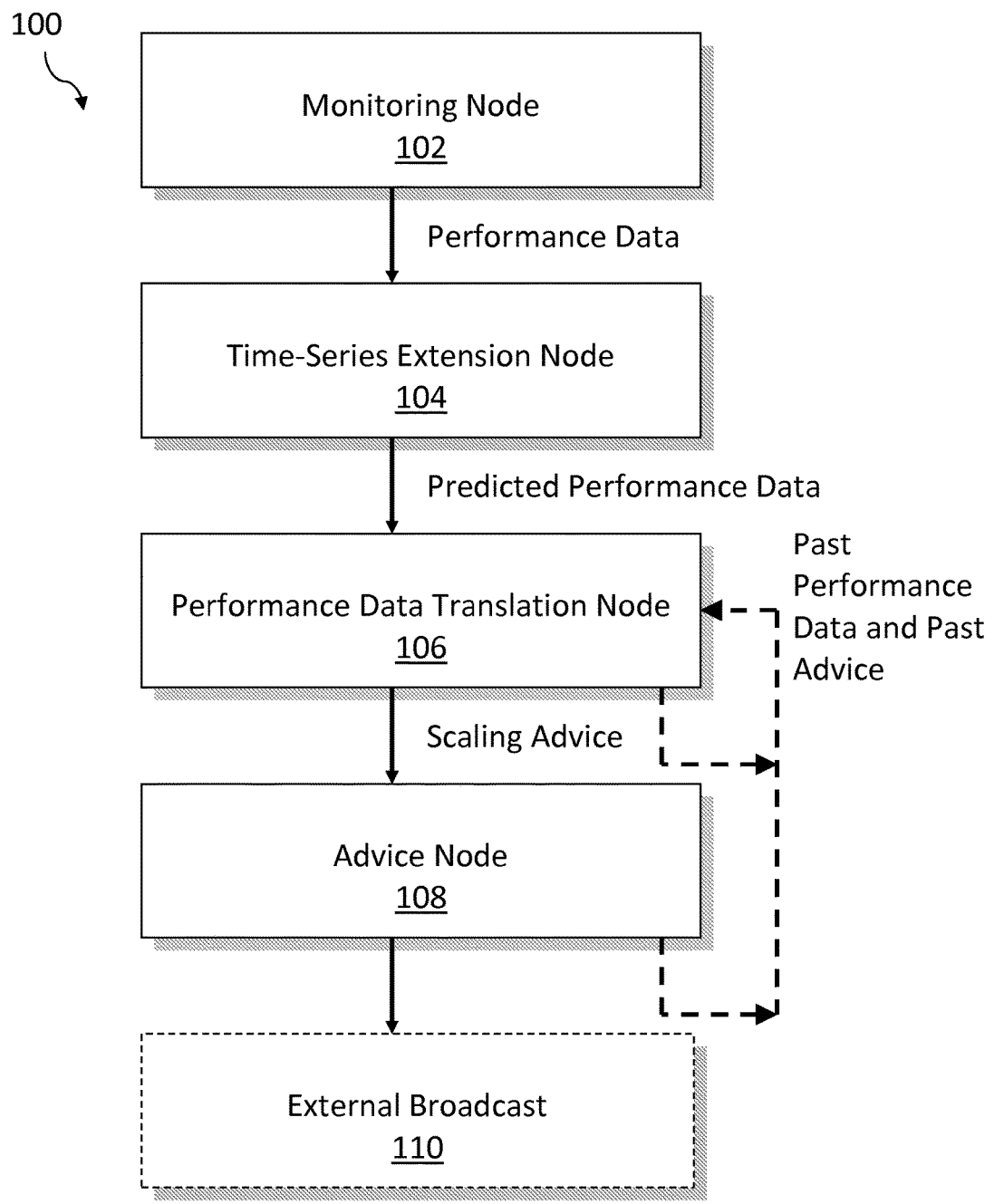
FIG. 1 is a block diagram of a system for adaptively autoscaling virtualized applications in accordance with embodiments of the present invention.

FIG. 1 illustrates a block diagram 100 in accordance with embodiments of the present invention. A monitoring node 102 collects time-dependent performance data from one or more running virtualized applications (this data is herein referred to as time-series data). A time-series extension node 104 receives the time-series data and extends it into the future by analyzing the time-series data and predicting the future performance of the virtualized application. A performance-data translation node 106 receives the extended time-series data, analyzes it, and determines if (a) the virtualized application is experiencing a resource-allocation problem (e.g., too little memory, CPU power, storage, or bandwidth) using its current set of resources or will likely experience a problem in the future, and (b) the virtualized application would not experience a resource-allocation problem, either now or in the future, using a different set of resources. If a different set of resources would reduce or eliminate a resource-allocation problem with the virtualized application, an advice node 108 receives this recommended set of different resources and makes an external broadcast 110 of same. The virtualized application, or the virtual server or cloud-management service running thereon, may then receive this advice and adjust the resources accordingly. Each of the blocks 102, 104, 106, 108 in FIG. 1 are described in greater below.

The monitoring node 102 gathers performance data in time-series format from a running virtualized application. The monitoring node may be installed locally on the same compute resource as the virtualized application and collect the data by communicating with the application or compute resource via, for example, an API or an operating-system resource-monitoring tool; the monitoring node 102 may then push the data out to the time-series extension node 104. Alternatively or in addition, the monitoring node 102 may be installed remotely to the virtualized application and request the data therefrom via a pull/polling request or similar means.

The time-series data may include a measure of the virtualized application's usage of one or more computing resources (e.g., memory, CPU power, storage, or bandwidth) at a plurality of points in time. The data may describe the raw amount of resource usage (e.g., number of megabytes of storage), the percentage of a total of available resources consumed (e.g., 50% of available disk space), or any other such measure. The time points may be collected periodically every, for example, 30 seconds, 60 seconds, 5 minutes, 60 minutes, or any other interval. The frequency of data collection may vary if, for example, a resource limit is approaching, at which time more frequent samples may be collected. If resource use is well under its limit, fewer samples may be collected. The monitoring node 102 may send the time-series data to the time-series extension node 104 as it arrives from the monitored application or, in other embodiments, periodically in batches.

The time-series extension node 104 receives the collected time-series data from the monitoring node 102 and analyzes it for behavior patterns, trends, periodicity, or other such factors, and extends the time-series data into the future by applying the extracted behavior patterns. For example, the time-series extension node 104 may determine that the utilization of one or more resources used by the virtualized application is increasing linearly in time; the time-series extension node 104 may therefore extract a best-fit line from the time-series data relative to the identified resource and extend the line to predict future resource needs. The time-series extension node 104 may then create additional time-series data representative of future resource needs in accordance with the best-fit extracted line. Other curves may be fit to the data, such as quadratic or cubic curves, periodic waveforms (e.g., sine waves), exponential or logarithmic curves, or any other such curves (or combinations thereof). The time-series extension node 104 may curve-fit a variety of curves or combinations of curves to the time-series data and select the one having the best fit by, for example, computing an error metric for each curve (e.g., sum of absolute differences between the curve and the time-series data). Any method for extending the time-series data is within the scope of the present invention, however.

The time-series data may be extended to any point in the future, to, e.g., one hour, twelve hours, one day, one month, or any other such span of time. In various embodiments, the amount of time that the time-series data is extended is a function of the accuracy of the curve-fitting (or other method to extract patterns from the time-series data); a more accurate curve-fit, for example, may permit the time-series extension node 104 to extend the time series further into the future.

Other factors may be used to extend the time-series data other than the time series received from the monitoring node 102. For example, the time-series extension node 104 may increase or decrease the predicted utilization based on the time of day, week, month, or year; business-based virtualized applications, such as stock-trading applications, for example, may see heavier use and require more resources during business hours on weekdays, while entertainment-based virtualized applications, such as video-on-demand applications, may see heavier use and require more resources during evenings, weekends, and holidays. The time-series extension node 104 may infer the type of application based on the received time-series data, or the type may be specified by a user or system administrator. If an application requires heavier resources during evenings and weekends, for example, the time-series extension node 104 may predict that the application will require even more resources during an upcoming holiday (for example) and adjust the predicted time-series data accordingly. The time-series extension node 104 may be programmed (by a user or system administrator) to adjust the predicted time-series data for additional upcoming events, such as upcoming marketing campaigns associated with an application, television events or specials, software launches, or other such events.

The performance-data translation node 106 receives the predicted performance data, in the form of the extended time series, from the time-series extension node 104. The performance-data translation node 106 may save the extended time-series data in a database or similar storage element or device for later use or analysis. In one embodiment, the performance-data translation node 106 analyzes the time-series data to determine if the virtualized application is experiencing, or will experience in the future, a shortfall or over-allocation of allocated resources (e.g., memory, storage, CPU power, throughput, or other such factors). The performance-data translation node 106 may compare the resource utilization shown by the time-series data against one or more thresholds, such as maximum available resources, and determine that the virtualized application is or will experience a resource shortfall if one or more of the resources used by the virtualized application exceeds or is approaching one or more of the thresholds. The performance-data translation node 106 may also or in addition determine that the virtualized application is or will experience a resource shortfall if a rate of change of resource utilization exceeds a threshold.

If the performance-data translation node 106 determines that the virtualized application needs or will need additional resources, the performance-data translation node 106 may calculate an amount of additional resources to add. For example, if the amount of over-utilization is a certain percentage above current utilization, the performance-data translation node 106 may recommend a corresponding percentage increase in resource allocation. In other embodiments, the performance-data translation node 106 recommends a resource increase greater than or equal to a maximum, average, median, or mean resource utilization seen or predicted in the time-series data. If a resource is under-utilized, the performance-data translation node 106 may recommend a decrease in resource allotment, as well.

As described above, the performance-data translation node 106 may analyze the time-series data collected from a running virtualized application and determine a resource under- or over-utilization based thereon. Particularly for newly created virtualized applications or newly created virtual machines upon which they run, no historical data may be available. In some embodiments, however, previous time-series data, past performance data, and or past advice may be available for the virtualized application, similar virtualized applications, and/or other applications running on the same or similar virtual machine. In these embodiments, the performance-data translation node 106 may analyze not just the time-series data collected from the virtualized application by the monitoring node 102, but instead or in addition, this historical data.

In one embodiment, previously collected time-series data is used to augment, enhance, or extend the received time-series data for the virtualized application. If, for example, the received time-series data was collected over only a brief period of time (e.g., one hour, twelve hours, or one day), it may not be complete enough for the time-series extension node 104 to accurately predict future performance. This situation may arise for newly created or recently rebooted virtualized applications, as well as virtualized applications that have recently changed their workload due to external factors. In one embodiment, the performance-data translation node 106 selects one or more previously collected time series that are relevant to the collected time-series data and makes a prediction about future resource requirements based thereon. Relevant previously collected time-series data may be selected by matching a name, type, class, or category of the virtualized application with similar information associated with the previously collected time-series data. Instead or in addition, one or more behavior characteristics of the collected time-series data may be matched against similar behavior characteristics in the collected time-series data (i.e., similar sizes of resources, similar trends in changing resources, or similar periodicity) to identify relevant previously collected time-series data.

In some embodiments, the previously collected time-series data spans one or more times at which the resources allocated to the virtualized application (or other, similar application) changed. The change in resource allocation may have been the result of advice produced by the performance-data translation node 106 and advice node 108, or by any other means. The performance-data translation node 106 may therefore extract the effects of any change to a resource allocation from the previously collected time-series data and use this information to adjust the resources allocated to the virtualized application. For example, if the same or other virtualized application experienced a resource under- or over-allocation in the past, and a re-allocation of resources was applied in the past to it, the performance-data translation node 106 may apply the same or similar re-allocation to the currently monitored virtualized application.

In other words, the performance-data translation node 106 may also receive from storage some of its previous input from the time-series extension node 104, as well as its own past predictions based on that data. More formally, at a given time $t_0$, the performance-data translation node 106 may receive a multidimensional time series on the interval $[t_1, t_2]$ from the time-series extension node 104, where $t_1 < t_0$. It may also receive a time series on the interval $[t'_1, t'_2]$, where $t'_2 < t_2$, and the predictions that the performance-data translation node 106 made based upon that time series; the interval $[t_1, t'_2]$, represents a previous time series from the time-series extension node 104. Using all or a subset of that data, the performance-data translation node 106 may then predict the future performance of the virtualized application on a possibly-different resource deployment. Many different resource re-allocation deployments may be considered by the performance-data translation node 106 for a given virtualized application, each adjusting some or all of available resource parameters (e.g., memory, CPU, storage, or bandwidth). Ultimately, the performance-data translation node 106 sends a schedule of resource allocation and re-allocation advice to the advice node 108; it also optionally records the advice it gave and the predictions it made for the performance of the application in question following that advice. It may further record its predictions for the performance of the application in question for resource deployments that it considered, but did not report to the advice node 108.)

The advice node 108 receives as input from the performance-data translation node 106 a schedule of scaling advice. It may then "publish" (i.e., makes available in some format, such as email, a web service, or some other means) this schedule. The published presentation may take the form of a schedule of resource allocation and re-allocation tasks formatted for an automatic application for scaling other applications within a virtualized environment and/or a schedule of resource allocation and re-allocation tasks that are formatted for human consumption. The advice node 108 may further publish a series of alerts or notifications designed to achieve application performance standards or benchmarks by means of resource allocation or re-allocation. Other formats in which the advice node 108 publishes its information are within the scope of the present invention.

Figure 2:
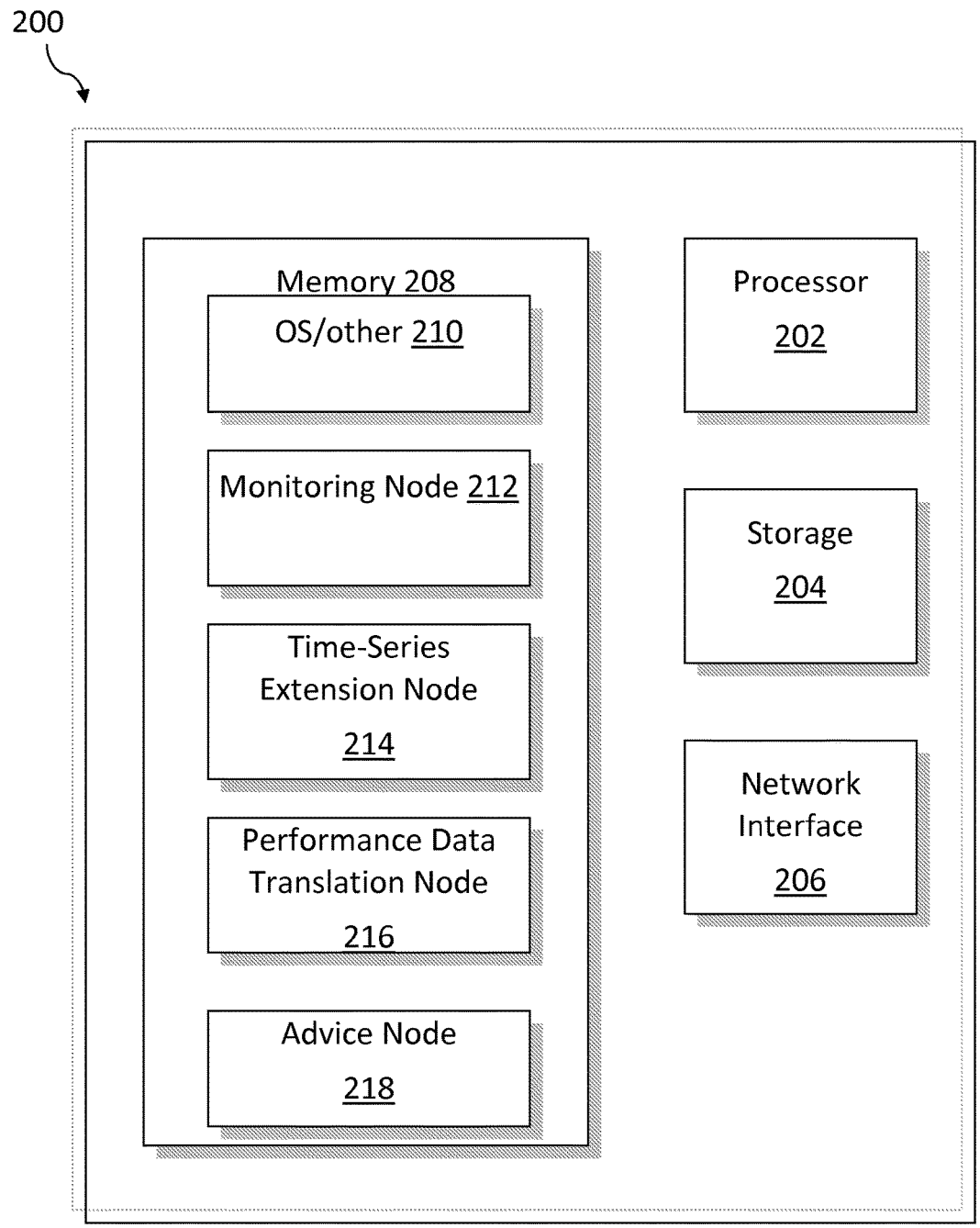
FIG. 2 is a system diagram of a system for adaptively autoscaling virtualized applications in accordance with embodiments of the present invention.

FIG. 2 illustrates an embodiment of a server 200 that includes the nodes discussed above with reference to FIG. 1. In this embodiment, the server 200 includes a processor 202, such as an INTEL XEON, non-volatile storage 204, such as a magnetic, solid-state, or flash disk, a network interface 206, such as ETHERNET or WI-FI, and a volatile memory 208, such as SDRAM. The storage 204 may store computer instructions which may be read into memory 208 and executed by the processor 202. The network interface 206 may be used to communicate with hosts in a cluster and/or a client, as described above. The present invention is not, however, limited to only the architecture of the server 200, and one of skill in the art will understand that embodiments of the present invention may be used with other configurations of servers or other computing devices. In particular, the nodes may be distributed across multiple servers 200.

The memory 208 may include instructions 210 for low-level operation of the server 200, such as operating-system instructions, device-driver-interface instructions, or any other type of such instructions. Any such operating system (such as WINDOWS, LINUX, or OSX) and/or other instructions are within the scope of the present invention, which is not limited to any particular type of operating system. The memory further includes instructions for a monitoring node 212, time-series extension node 214, performance-data translation node 216, and advice node 218. The nodes include computer instructions in accordance with their functions and data discussed above; the present invention is not limited to only this allocation of instructions, however, and any such arrangement is within its scope. For example, different nodes may be combined, and other nodes may run on other servers (e.g., the monitoring node 212 may run on a server hosting a monitored virtualized application).

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for autoscaling virtualized applications, the method comprising:
    electronically receiving performance data in time-series format from a running virtualized application, wherein the performance data is collected at a frequency that varies depending on a proximity of the running virtualized application to a resource limit;
    computationally analyzing the performance data to determine a pattern therein;
    storing the performance data in a computer database;
    extending the performance data to a time in the future based at least on the determined pattern, wherein the time in the future to which the performance data is extended is based on an accuracy of a fit between the performance data and the pattern;
    receiving information regarding events external to the virtualized application;
    computationally analyzing the extended performance data over the amount of time, wherein computationally analyzing includes determining, based at least in part on the information regarding events external to the virtualized application, if resources allocated to the virtualized application are under-utilized or over-utilized, and adjusting at least part of the extended performance data at a future time associated with events external to the virtualized application, responsive to determining whether resources allocated to the virtualized application are under-utilized or over-utilized; and creating a schedule for re-allocating resources to the virtualized application based at least in part on a result of the analysis of the extended performance data.

2. The method of claim 1, further comprising analyzing previously collected performance data for the virtualized application or a similar virtualized application, wherein determining if resources allocated to the virtualized application are under-utilized or over-utilized is further based on the previously collected performance data.

3. The method of claim 2, wherein the previously collected performance data comprises a point in time at which a resource re-allocation occurred, and wherein determining if resources allocated to the virtualized application are under-utilized or over-utilized is further based on an effect of the re-allocation.

4. The method of claim 2, wherein the similar virtualized application shares a name, type, class or behavior pattern with the virtualized application.

5. The method of claim 1, wherein the pattern comprises a fitted curve, line, or periodic function.

6. The method of claim 1, wherein the time in the future comprises one hour, twelve hours, one day, or one month.

7. The method of claim 1, wherein the external events comprise a time of day, week, month, or year, a software launch, or a marketing event.

8. The method of claim 1, wherein the performance data is extended based on curve fitting, the amount of time in the future that the performance data is extended depending on an accuracy of the curve fitting.

9. The method of claim 8, wherein the accuracy is determined using an error metric.

10. A system for autoscaling virtualized applications, the system comprising:
   a computer processor configured for executing computer instructions for computationally executing the steps of:
   i. receiving performance data in time-series format from a running virtualized application, wherein the performance data is collected at a frequency that varies depending on a proximity of the running virtualized application to a resource limit;
   ii. analyzing the performance data to determine a pattern therein;
   iii. extending the performance data to a time in the future based at least on the determined pattern, wherein the time in the future to which the performance data is extended is based on an accuracy of a fit between the performance data and the pattern;
   iv. receiving information regarding events external to the virtualized application;
   v. analyzing the extended performance data over the amount of time, wherein analyzing includes to determining, based at least in part on the information regarding events external to the virtualized application, if resources allocated to the virtualized application are underutilized or over-utilized, and adjusting at least part of the extended performance data at a future time associated with events external to the virtualized application responsive to determining whether resources allocated to the virtualized application are under-utilized or over-utilized; and
   vi. creating a schedule for re-allocating resources to the virtualized application based at least in part on a result of the analysis of the extended performance data; and
   a database for storing performance data related to the execution of the plurality of virtual machines.

11. The system of claim 10, further comprising analyzing previously collected performance data for the virtualized application or a similar virtualized application, wherein determining if resources allocated to the virtualized application are underutilized or over-utilized is further based on the previously collected performance data.

12. The system of claim 11, wherein the previously collected performance data comprises a point in time at which a resource re-allocation occurred, and wherein determining if resources allocated to the virtualized application are under-utilized or over-utilized is further based on an effect of the re-allocation.

13. The system of claim 11, wherein the similar virtualized application shares a name, type, class or behavior pattern with the virtualized application.

14. The system of claim 10, wherein the pattern comprises a fitted curve, line, or periodic function.

15. The system of claim 10, wherein the time in the future comprises one hour, twelve hours, one day, or one month.

16. The system of claim 10, wherein the external events comprise a time of day, week, month, or year, a software launch, or a marketing event.

17. The system of claim 10, wherein the performance data is extended based on curve fitting, the amount of time in the future that the performance data is extended depending on an accuracy of the curve fitting.

18. The system of claim 17, wherein the accuracy is determined using an error metric.

* * * * *